United States Patent [19]

Morimoto et al.

[11] Patent Number: 4,740,869

[45] Date of Patent: Apr. 26, 1988

[54] ELECTROLYTIC CAPACITOR

[75] Inventors: Takeshi Morimoto; Toshiya Matsubara; Yoshiki Hamatani, all of Yokohama; Naoto Iwano; Hideo Shimizu, both of Fujisawa; Shigeo Komatsu; Hidemi Yamada, both of Yokohama, all of Japan

[73] Assignees: Asahi Glass Company Ltd., Tokyo; Elna Company Ltd., Fujisawa, both of Japan

[21] Appl. No.: 930,415

[22] Filed: Nov. 14, 1986

[30] Foreign Application Priority Data

Nov. 14, 1985 [JP] Japan .................................. 60-253661
Aug. 20, 1986 [JP] Japan .................................. 60-192669

[51] Int. Cl.$^4$ .............................................. H01G 9/02
[52] U.S. Cl. .................................... 361/433; 252/62.2
[58] Field of Search ............... 252/62.2, 567, 578–581; 361/314–319, 433

[56] References Cited

U.S. PATENT DOCUMENTS

| | | | |
|---|---|---|---|
| 2,923,867 | 2/1960 | Robinson | 361/433 |
| 2,932,153 | 4/1960 | Bernard et al. | 361/433 |
| 3,676,752 | 7/1972 | Burger et al. | 361/433 |
| 3,811,077 | 5/1974 | Munch | 361/315 |
| 3,928,705 | 12/1975 | Loft et al. | 252/578 |
| 4,381,536 | 4/1983 | Ross et al. | 361/433 |
| 4,469,610 | 9/1984 | Fukuda et al. | 361/433 X |

*Primary Examiner*—Donald A. Griffin
*Attorney, Agent, or Firm*—Oblon, Fisher, Spivak, McClelland & Maier

[57] ABSTRACT

An electrolytic capacitor comprising a capacitor element and an electrolyte impregnated to the element, wherein the electrolyte contains a flurorocarboxylic acid or its salt as a solute dissolved in an organic solvent.

12 Claims, No Drawings

ELECTROLYTIC CAPACITOR

The present invention relates to an electrolytic capacitor. More particularly, it relates to an electrolytic capacitor wherein a novel electrolyte is used.

An electrolytic capacitor having a capacitor element prepared by rolling foils of a valve metal such as aluminum together with a separator, usually has a structure wherein an electrolyte is impregnated to the capacitor element, and such a capacitor element is accomodated and sealed in a metal casing such as an aluminum casing or in a casing made of a synthetic resin.

It is known to employ, as an electrolyte for the electrolytic capacitor, a solution obtained by dissolving an organic acid or organic acid salt such as adipic acid or ammonium adipate in a polar solvent such as glycerol or ethylene glycol. (See e.g. Japanese Examined Patent Publication No. 13019/1983 or Japanese Unexamined Patent Publication No. 159321/1983.)

However, the above-mentioned electrolyte has drawbacks such that it is unstable at a high temperature of 120° C. or higher, and the durability characteristic is not good.

For high temperature electrolytic capacitors, organic acid-type electrolytes have been used and studied wherein an organic acid having a relatively large molecular weight or its salt is used as a solute.

As the solute for an organic acid-type electrolyte for a medium to high voltage capacitor, it is known to use, for example, 1,6-decanedicarboxylic acid (Japanese Examined Patent Publication No. 13293/1975 for "Electrolyte for Electrolytic Capacitor") or its salt. In the electrolytic capacitor wherein the electrolyte containing 1,6-decanedicarboxylic acid is used, the solute itself reacts with the aluminum foils constituting the capacitor element, to form a complex, whereby the initial capacitance is low, and further, in the high temperature life tests or in the high temperature storage tests, a sharp decrease in the capacitance and a considerable increase in the leakage current are observed. Thus, such a capacitor is incapable of satisfying the requirements for a high performance electrolytic capacitor. For this reason, it has been proposed to incorporate maleic acid (Japanese Unexamined Patent Publication No. 92208/1983 "Electrolyte for Electrolytic Capacitor") or citric acid (Japanese Unexamined Patent Publication No. 219920/1984 "Electrolyte for Electrolytic Capacitor") as an additive to 1,6-decanedicarboxylic acid. Such a proposal has a drawback that the electrolyte is still poor in the thermal stability.

It is an object of the present invention to overcome the above-mentioned drawbacks inherent to the conventional techniques.

Another object of the present invention is to provide an electrolytic capacitor wherein a novel electrolyte is employed.

A further object of the present invention is to substantially lower the specific resistance of the electrolyte and thereby to reduce the tangent of loss angle and the impedance at high frequency of the electrolytic capacitor, and to provide an electrolytic capacitor which is capable of suppressing the change in the capacitance and the increase in the leakage current and which is durable and reliable even at a high temperature.

The present invention provides an electrolytic capacitor comprising a capacitor element and an electrolyte impregnated to the element, wherein the electrolyte contains a fluorocarboxylic acid or its salt as a solute dissolved in an organic solvent.

Now, the present invention will be described in detail with reference to the preferred embodiments.

In the present invention, a solution of a fluorocarboxylic acid or its salt in an organic solvent is used. The fluorocarboxylic acid or its salt may preferably be a perfluorodibasic acid represented by the general formula $C_nF_{2n}(COOH)_2$ wherein n is preferably from 1 to 12, more preferably from 2 to 6, or its salt, or a perfluoromonobasic acid represented by the general formula $C_nF_{2n+1}COOH$ wherein n is as defined above, or its salt. Further, it is possible to employ a perfluorocarboxylic acid polymer soluble in an organic solvent obtained by hydrolysing a copolymer of $CF_2\!=\!CF_2$ with $CF\!=\!CFO(CF_2)_{1-12}COOR$ wherein R is a lower alkyl group, or its salt. Particularly good results are obtainable when a perfluorodicarboxylic acid or its salt is used among them. The perfluoro group such as $C_nF_{2n}$ or $C_nF_{2n+1}$, may be a straight chain type or a branched chain type.

The salts of the above carboxylic acids may preferably be ammonium salts, quaternary ammonium salts, amine salts or alkali metal salts. Among them, ammonium salts and quaternary ammonium salts are particularly preferred as they provide high conductivity.

As preferred examples of the fluorocarboxylic acid or its salt, there may be mentioned perfluoromalonic acid, perfluorosuccinic acid, perfluoroglutaric acid, perfluoroadipic acid, perfluorodecanedicarboxylic acid, perfluoropimelic acid, perfluorosuberic acid, trifluoroacetic acid, perfluoropelargonic acid, perfluoroundecylic acid or their salts.

The fluorocarboxylic acid or its salt may be used, if necessary, in combination with other solutes to form an electrolyte. As such other solutes, a hydrocarbon carboxylic acid or its salt, an aromatic carboxylic acid or its salt, and an inorganic acid or its salt, may be mentioned as preferred examples.

The above-mentioned hydrocarbon carboxylic acid or its salt may preferably be a dibasic acid of the formula $C_nH_{2n}(COOH)_2$ wherein n is preferably from 1 to 12, more preferably from 2 to 10, or its salt, or a monobasic acid of the formula $C_nH_{2n+1}COOH$ wherein n is as defined above, or its salt. As the salt, an alkali metal salt, an amine salt, an ammonium salt or a quaternary ammonium salt may be mentioned. Particularly preferred is an ammonium salt or a quaternary ammonium salt.

Preferred examples of the above-mentioned hydrocarbon carboxylic acid or its salt, include 1,6-decanedicarboxylic acid, 1,10-decanedicarboxylic acid, caproic acid, pivalic acid, adipic acid, caprylic acid, pyromellitic acid, and their salts.

The above-mentioned aromatic carboxylic acid includes benzoic acid, toluic acid, p-hydroxybenzoic acid, phthalic acid, salicylic acid, pyromellitic acid and a halobenzoic acid.

Likewise, the above-mentioned inorganic acid includes boric acid, heteropoly-acid, metatungstic acid and paratungstic acid.

The organic solvent for the electrolyte of the present invention is preferably an organic polar solvent. As such a solvent, any organic polar solvent which is commonly employed for an electrolyte, may be used. Preferred solvents include amides, lactones, glycols, sulfur compounds and carbonates. Particularly preferred examples include propyl carbonate, dimethylformamide, N-methylformamide, butyrolactone, N-methylpyrrolidone, dimethylsulfoxide, ethylene cyanohydrin, ethylene glycol, and a mono- or di-alkyl ether of ethylene glycol.

The concentration (content) of the fluorocarboxylic acid or its salt in the electrolyte of the present invention is preferably from 1 to 70% by weight, more preferably from 5 to 60% by weight.

When the fluorocarboxylic acid or its salt is used in combination with other solutes, the amount of such other solutes is selected depending upon the type of such solutes. Usually, such other solutes are used preferably in an amount of from 1 to 50% by weight, more preferably from 5 to 40% by weight in the electrolyte. When used in combination with the hydrocarbon carboxylic acid or its salt, the fluorocarboxylic acid is preferably in an amount of from 0.1 to 5% by weight, more preferably from 0.1 to 2% by weight, in the electrolyte, to obtain particularly excellent effects.

The electrolyte in the electrolytic capacitor of the present invention is preferably adjusted to have a pH of from 4 to 8, more preferably from 5 to 7, for the prevention of corrosion of the electrode foils. The pH of the electrolyte may be adjusted with an alkali, as the case requires. As such an alkali source, ammonia or an alkyl amine may suitably be employed. Ammonia is most preferred as it provides a sufficiently high conductivity and sparking voltage. Ammonia may be incorporated in the form of aqueous ammonia. However, it is preferred to incorporate it in the form of ammonium fluorocarboxylate or ammonium hydrocarbon carboxylate, whereby the control of water content can readily be effected.

The water content in the electrolyte is as small as possible from the viewpoint of the durability of the electrolytic capacitor, and is usually within the range of from 0.5 to 20% by weight. When the capacitor is intended for use at a high temperature for a long period time, the water content is preferably at most 5% by weight.

The electrolytic capacitor of the present invention includes various types of capacitors. In a typical type, an aluminum foil anode and an aluminum foil cathode separated by a suitable separator such as paper, are used, and they are rolled into a cylindrical shape to obtain a capacitor element, and an electrolyte is impregnated to this capacitor element. The amount of the impregnated electrolyte is preferably from 50 to 300% by weight relative to the separator. The capacitor element impregnated with the electrolyte is accomodated and sealed in a casing made of a corrosion resistant metal such as aluminum or of a synthetic resin.

Now, the present invention will be described in further detail with reference to Examples. However, it should be understood that the present invention is by no means restricted to these specific Examples, and various changes or modifications may be made within the scope of the present invention. For instance, in a case where a 1,6-decanedicarboxylic acid salt or a fluorocarboxylic acid salt is used, such a salt may be added by itself in an organic polar solvent, or it may be added in the form of a raw material or substance which is capable of being converted to such a salt.

Further, other substances may be added within the respective ranges not to impair the object of the present invention.

For instance, a phosphate, a boric acid, a polyhydric alcohol, etc. may be added to the electrolyte of the present invention, as chemical improvers, as the case requires.

EXAMPLE 1 AND COMPARATIVE EXAMPLE 1

72.5 g of a perfluoroadipic acid ($HOOCCF_2CF_2CF_2COOH$) was dissolved in 500 g of ethylene glycol, and aqueous ammonia was added to adjust the solution to pH6. This electrolyte contained 4.2% by weight of water.

On the other hand, 36.5 g of adipic acid ($HCOOCCH_2CH_2CH_2CH_2COOH$) was dissolved in 500 g of ethylene glycol, and aqueous ammonia was added to adjust the solution to pH6. This electrolyte contained 3.1% of water.

Each electrolyte was sealed in a container and maintained at 125° C., and the change in the specific resistance of the electrolyte was examined. The results are shown in Table 1.

TABLE 1

| Time (hrs.) kept at 125° C. | Specific resistance ($\Omega$cm, 40° C.) | |
|---|---|---|
| | Perfluoroadipic acid system | Adipic acid system |
| 0 | 150 | 206 |
| 1000 | 155 | 476 |
| 2000 | 158 | 609 |

It is evident from Table 1 that the change in the specific resistance is smaller and the stability at a high temperature is higher in the case where the perfluoroadipic acid was used.

EXAMPLE 2 AND COMPARATIVE EXAMPLE 2

295 g of perfluorodecanedicarboxylic acid ($HOOC(CF_2)_{10}COOH$) was dissolved in 500 g of ethylene glycol, and a 10 wt. % tetramethylammonium hydroxide aqueous solution was added to adjust the solution to pH6. This solution was heated for evaporation of water to adjust the water content to 1.5% by weight.

On the other hand, an electrolyte was prepared in the same manner as above except that 115 g of decanedicarboxylic acid ($HOOC(CH_2)_{10}COOH$) was used.

By using each electrolyte, the relation between the time kept at 125° C. and the specific resistance, was obtained in the same manner as in Example 1. The results are shown in Table 2.

TABLE 2

| Time (hrs.) kept at 125° C. | Specific resistance ($\Omega$cm, 40° C.) | |
|---|---|---|
| | Perfluorodecanedicarboxylic acid system | Decanedicarboxylic acid system |
| 0 | 480 | 546 |
| 1000 | 482 | 610 |
| 2000 | 485 | 680 |

It is evident from Table 2 that the change in the specific resistance is smaller and the stability at a high temperature is higher in the case where the perfluorodecanedicarboxylic acid was used.

EXAMPLE 3 AND COMPARATIVE EXAMPLE 3

An electrolyte was prepared in the same manner as in Example 1 except that perfluoroglutaric acid ($HOOCCF_2CF_2CF_2COOH$) was used instead of perfluoroadipic acid, and an aqueous sodium hydroxide solution was used instead of aqueous ammonia. This electrolyte contained 4.4% by weight of water.

On the other hand, an electrolyte was prepared in the same manner as in Comparative Example 1 except that glutaric acid was used instead of adipic acid, and an aqueous sodium hydroxide solution was used instead of aqueous ammonia. This electrolyte contained 4.0% by weight of water.

By using each electrolyte, the relation between the time kept at 125° C. and the specific resistance was obtained in the same manner as in Example 1. The results are shown in Table 3.

TABLE 3

| Time (hrs.) kept at 125° C. | Specific resistance (Ωcm, 40° C.) | |
|---|---|---|
| | Perfluoroglutaric acid system | Gultaric acid system |
| 0 | 201 | 317 |
| 1000 | 205 | 420 |
| 2000 | 203 | 440 |

It is evident from Table 3 that the stability at a high temperature is higher in the case where the perfluoroglutaric acid was used.

EXAMPLE 4

Electrolytes identified below by Comparative Examples 4-1 to 4-4 and electrolytes identified below by Examples 4-1 to 4-4 wherein the acids used in the Comparative Examples were replaced by perfluorodicarboxylic acids, respectively, were prepared. By using these electrolytes, capacitors prescribed for 470 μF/200 V D.C. were prepared, and subjected to high temperature life tests at 105° C. for 2000 hours at the working voltage, and to high temperature storage tests at 105° C. for 1000 hours. The results are shown in Tables 4 and 5, respectively.

Comparative Example 4-1

| | |
|---|---|
| Ammonium benzoate | 9 |
| Benzoic acid | 3 |
| Water | 3 |
| Ethylene glycol | 85 |

Example 4-1

| | |
|---|---|
| Ammonium benzoate | 9 |
| Perfluoroglutaric acid | 3 |
| Water | 3 |
| Ethylene glycol | 85 |

Comparative Example 4-2

| | |
|---|---|
| Ammonium p-toluylate | 9 |
| p-Toluylic acid | 3 |
| Water | 3 |
| Ethylene glycol | 85 |

Example 4-2

| | |
|---|---|
| Ammonium p-toluylate | 9 |
| Perfluoroadipic acid | 3 |
| Water | 3 |
| Ethylene glycol | 85 |

Comparative Example 4-3

| | |
|---|---|
| Ammonium caproate | 6 |
| Carproic acid | 5 |
| Water | 3 |
| Ethylene glycol | 86 |

Example 4-3

| | |
|---|---|
| Ammonium caproate | 6 |
| Perfluorosuberic acid | 5 |
| Water | 3 |
| Ethylene glycol | 86 |

Comparative Example 4-4

| | |
|---|---|
| Ammonium pivalate | 6 |
| Pivalic acid | 5 |
| Water | 3 |
| Ethylene glycol | 86 |

Example 4-4

| | |
|---|---|
| Ammonium pivalate | 6 |
| Perfluorosebacic acid | 5 |
| Water | 3 |
| Ethylene glycol | 86 |

TABLE 4

High temperature life test (105° C. for 2000 hrs.)

| | Initial properties | | | Properties after the test | | |
|---|---|---|---|---|---|---|
| | Capacitance (μF) | Tangent of loss angle | Leakage current (μA) | Change (%) in the capacitance | Tangent of loss angle | Leakage current (μA) |
| Comparative Example 4-1 | 460 | 0.039 | 30.1 | −5.8 | 0.048 | 22.2 |
| Example 4-1 | 472 | 0.034 | 25.6 | −3.0 | 0.038 | 18.5 |
| Comparative Example 4-2 | 465 | 0.040 | 30.3 | −5.2 | 0.049 | 23.3 |
| Example 4-2 | 469 | 0.035 | 24.9 | −3.1 | 0.040 | 18.6 |
| Comparative Example 4-3 | 470 | 0.043 | 35.8 | −20.8 | 0.071 | 25.3 |
| Example 4-3 | 473 | 0.037 | 26.6 | −5.1 | 0.044 | 20.2 |
| Comparative Example 4-4 | 461 | 0.040 | 36.1 | −18.4 | 0.066 | 24.7 |
| Example 4-4 | 468 | 0.034 | 28.2 | −4.1 | 0.042 | 19.6 |

TABLE 5

High temperature storage test (105° C. for 1000 hrs.)

| | Initial properties | | | Properties after of test | | |
|---|---|---|---|---|---|---|
| | Capacitance (μF) | Tangent of loss angle | Leakage current (μA) | Change (%) in the capacitance | Tangent of loss angle | Leakage current (μA) |
| Comparative Example 4-1 | 466 | 0.039 | 33.5 | −2.7 | 0.042 | 310 |
| Example 4-1 | 471 | 0.033 | 25.8 | −2.1 | 0.035 | 120 |
| Comparative Example 4-2 | 468 | 0.039 | 30.8 | −3.1 | 0.043 | 330 |
| Example 4-2 | 475 | 0.035 | 26.1 | −1.9 | 0.038 | 110 |
| Comparative Example 4-3 | 460 | 0.044 | 36.2 | −12.3 | 0.064 | 1200 |

TABLE 5-continued

| | High temperature storage test (105° C. for 1000 hrs.) | | | | | |
|---|---|---|---|---|---|---|
| | Initial properties | | | Properties after of test | | |
| | Capacitance (μF) | Tangent of loss angle | Leakage current (μA) | Change (%) in the capacitance | Tangent of loss angle | Leakage current (μA) |
| Example 4-3 | 471 | 0.037 | 25.7 | −4.1 | 0.041 | 280 |
| Comparative Example 4-4 | 469 | 0.040 | 35.8 | −10.7 | 0.058 | 1310 |
| Example 4-4 | 466 | 0.034 | 21.1 | −3.7 | 0.039 | 290 |

It is evident from the results of Tables 4 and 5 that by substituting perfluorocarboxylic acids for carboxylic acids, it is possible to suppress the changes in the properties, particularly the increase of the leakage current in the storage tests and the change in the capacitance.

EXAMPLE 5

Electrolytes of the present invention prepared by dissolving the 1,6-decanedicarboxylic acid or its salt as the main component in an organic polar solvent, followed by an addition of a fluorocarboxylic acid, are presented in Table 6 together with Comparative Examples. The compositions of the electrolytes are indicated by % by weight, and the specific resistance (Ωcm) is the one measured at an electrolyte temperature of 20° C. Further, the spark voltage was the one measured at 85° C.

TABLE 6

| | Electrolyte Compositions | | | |
|---|---|---|---|---|
| | Electrolyte compositions (wt %) | | Specific resistance (Ωcm) | Spark voltage (V) |
| Comparative Example 5-1 | 1,6-Decanedicarboxylic acid | 15 | 580 | 435 |
| | Aqueous ammonia | 4.5 | | |
| | Maleic aid | 0.2 | | |
| | Ethylene glycol | 80.3 | | |
| Comparative Example 5-2 | 1,6-Decanedicarboxylic acid | 15 | 580 | 430 |
| | Aqueous ammonia | 4.5 | | |
| | Citric acid | 0.2 | | |
| | Ethylene glycol | 80.3 | | |
| Example 5-1 | 1,6-Decanedicarboxylic acid | 15 | 470 | 440 |
| | Aqueous ammonia | 4.5 | | |
| | Perfluoromalonic acid | 0.3 | | |
| | Ethylene glycol | 80.2 | | |
| Example 5-2 | 1,6-Decanedicarboxylic acid | 13 | 480 | 450 |
| | 1,10-Decanedicarboxylic acid | 2 | | |
| | Aqueous ammonia | 4.5 | | |
| | Perfluorosuccinic acid | 0.3 | | |
| | Ethylene glycol | 80.2 | | |
| Example 5-3 | 1,6-Decanedicarboxylic acid | 10 | 480 | 450 |
| | 1,10-Decanedicarboxylic acid | 1 | | |
| | 5,6-Decanedicarboxylic acid | 4 | | |
| | Aqueous ammonia | 4.5 | | |
| | Perfluoroglutaric acid | 0.3 | | |
| | Ethylene glycol | 80.2 | | |
| Example 5-4 | 1,6-Decanedicarboxylic acid | 10 | 460 | 445 |
| | 1,10-Decanedicarboxylic acid | 1 | | |
| | 5,6-Decanedicarboxylic acid | 4 | | |
| | Aqueous ammonia | 4.5 | | |
| | Perfluoroadipic acid | 0.3 | | |
| | Ethylene glycol | 80.2 | | |
| Example 5-5 | 1,6-Decanedicarboxylic acid | 15 | 490 | 450 |
| | Isopropyl amine | 2 | | |
| | Perfluoropimelic acid | 0.3 | | |
| | Ethylene glycol | 82.7 | | |
| Example 5-6 | 1,6-Decanedicarboxylic acid | 12 | 500 | 450 |
| | 1,10-Decanedicarboxylic acid | 4 | | |
| | Aqueous ammonia | 3 | | |
| | Perfluorosuberic acid | 0.3 | | |
| | Ethylene glycol | 65 | | |
| | Diethylene glycol | 15.7 | | |
| Example 5-7 | 1,6-Decanedicarboxylic acid | 15 | 475 | 440 |
| | Aqueous ammonia | 4.5 | | |
| | Trifluoroacetic acid | 0.3 | | |
| | Ethylene glycol | 80.2 | | |
| Example 5-8 | 1,6-Decanedicarboxylic acid | 13 | 480 | 450 |
| | 1,10-Decanedicarboxylic acid | 2 | | |
| | Aqueous ammonia | 4.5 | | |
| | Perfluoropelargonic acid | 0.3 | | |
| | Ethylene glycol | 80.2 | | |
| Example 5-9 | 1,6-Decanedicarboxylic acid | 10 | 460 | 450 |
| | 1,10-Decanedicarboxylic acid | 1 | | |
| | 5,6-Decanedicarboxylic acid | 4 | | |
| | Aqueous ammonia | 4.5 | | |
| | Perfluoroundecylic acid | 0.3 | | |
| | Ethylene glycol | 80.2 | | |

By using electrolytes of Comparative Examples 5-1 and 5-2 and Examples 5-2, 5-4 and 5-8 among the electrolytes shown in Table 6, electrolytic capacitors (prescribed for 10 μF/400 V D.C.) were prepared. Twenty samples of each capacitor were subjected to a high temperature life test at a temperature of 105° C. for 1000 hours at the working voltage. The results are shown in Table 7. Further, electrolytic capacitors (prescribed for 200 μF/400 V D.C.) were subjected to a high temperature storage test at 105° C. for 1000 hours. The results are shown in Table 8. Each value for the initial properties and the properties after the test is an average value of 20 samples of each electrolytic capacitor.

TABLE 7

Comparison of properties (10 μF/400 V D.C.)

| | Initial properties | | | Properties after the high temperature life test | | |
|---|---|---|---|---|---|---|
| | Capacitance (μF) | Tangent of loss angle | Leakage current (μA) | Change (%) in the capacitance | Tangent of loss angle | Leakage current (μA) |
| Comparative Example 5-1 | 9.8 | 0.050 | 1.0 | −7.0 | 0.060 | 1.0 |
| Comparative Example 5-2 | 9.5 | 0.048 | 0.9 | −9.2 | 0.065 | 0.9 |
| Example 5-2 | 10.8 | 0.044 | 0.8 | −2.8 | 0.047 | 0.7 |
| Example 5-4 | 10.6 | 0.046 | 0.9 | −3.4 | 0.052 | 0.8 |
| Example 5-8 | 10.8 | 0.046 | 0.9 | −3.5 | 0.053 | 0.7 |

TABLE 8

Comparison of properties (220 μF/400 V D.C.)

| | Initial properties | | | | Properties after the high temperature storage test | | |
|---|---|---|---|---|---|---|---|
| | Capacitance (μF) | Tangent of loss angle | Leakage current (μA) | Impedance (Ω) 100 KHz | Change (%) in the capacitance | Tangent of loss angle | Leakage current (μA) |
| Comparative Example 5-1 | 215 | 0.050 | 30.2 | 0.17 | −6.5 | 0.065 | 1280 |
| Comparative Example 5-2 | 208 | 0.048 | 18.2 | 0.15 | −8.2 | 0.068 | 1050 |
| Example 5-2 | 230 | 0.041 | 10.5 | 0.10 | −1.6 | 0.044 | 380 |
| Example 5-4 | 228 | 0.043 | 10.8 | 0.11 | −2.0 | 0.049 | 420 |
| Example 5-8 | 231 | 0.042 | 10.7 | 0.11 | −2.2 | 0.048 | 450 |

It is evident from Tables 7 and 8 that in Comparative Examples 5-1 and 5-2, the initial values of capacitance are lower by about 5% relative to the prescribed value, and the changes in the capacitance after the tests are substantial. Further, as is evident from Table 8, in Comparative Examples 5-1 and 5-2, the leakage currents are substantial when they are compared with Examples 5-2, 5-4 and 5-8.

The decrease in capacitance in the Comparative Examples 5-1 and 5-2 shown in Tables 7 and 8, are attributable to the fact that 1,6-decanedicarboxylic acid in the electrolyte reacts with the aluminum foils constituting the capacitor element to result in the remarkable decrease of the surface area. The increase in the leakage current is attributable to the fact that 1,6-decanedicarboxylic acid reacts with the aluminum anode oxide film as a dielectric material to form an unstable aluminum complex film, which will be dissolved in the electrolyte at a high temperature, whereby the leakage current increases.

On the other hand, by the addition of a fluorocarboxylic acid to the solute composed mainly of 1,6-decanedicarboxylic acid or its salt, the formation of the complex of 1,6-decanedicarboxylic acid is suppressed. Further, by lowering the specific resistance, the tangent of loss angle or the impedance at a high frequency, can be suppressed to a low level.

We claim:

1. An electrolytic capacitor comprising a capacitor element and an electrolyte impregnated to the element, wherein the electrolyte contains a perfluorodicarboxylic acid having from 1 to 12 carbon atoms or a salt thereof as a solute dissolved in an organic solvent.

2. The electrolytic capacitor according to claim 1, wherein the perflouorodicarboxylic acid salt is an alkali metal salt, an amine salt, an ammonium salt, or a quaternary ammonium salt.

3. The electrolytic capacitor according to claim 1, wherein the electrolyte contains a hydrocarbon caboxylic acid or its salt as an additional solute.

4. The electrolytic capacitor according to claim 3, wherein the hydrocarbon carboxylic acid is a monobasic or dibasic acid having from 2 to 15 carbon atoms.

5. The electrolytic capacitor according to claim 3, wherein the hydrocarbon carboxylic acid salt is an alkali metal salt, an amine salt, an ammonium salt, or a quaternary ammonium salt.

6. The electrolytic capacitor according to claim 3, wherein the content of the hydrocarbon carboxylic acid or its salt in the electrolyte is from 1 to 50% by weight, 7. The electrolytic capacitor according to claim 1, wherein the organic solvent is an organic polar solvent.

8. The electrolytic capacitor according to claim 7 wherein the organic polar solvent is ethylene glycol and/or γ-butyl lactone.

9. The electrolytic capacitor according to claim 7, wherein the content of the perfluorodicarboxylic acid or its salt in the electrolyte is from 0.1 to 5% by weight.

10. The electrolytic capacitor according to claim 1, wherein the content of the perfluorodicarboxylic acid or its salt in the electrolyte is from 1 to 70% by weight.

11. The electrolytic capacitor according to claim 1, wherein the electrolyte has a pH of from 4 to 8.

12. The electrolytic capacitor according to claim 1, wherein the content of water in the electrolyte is from 0.5 to 20% by weight.

* * * * *

UNITED STATES PATENT AND TRADEMARK OFFICE
CERTIFICATE OF CORRECTION

PATENT NO. : 4,740,869
DATED : Apr. 26, 1988
INVENTOR(S) : Takeshi Morimoto, et al.

It is certified that error appears in the above-identified patent and that said Letters Patent is hereby corrected as shown below: Title page:

Under Foreign Application Priority Data, the second listing should read as follows:

Aug. 20, 1986 [JP] Japan ............... 6__1__-192669

Signed and Sealed this

Twenty-third Day of August, 1988

Attest:

DONALD J. QUIGG

Attesting Officer

Commissioner of Patents and Trademarks